United States Patent [19]
Johnson et al.

[11] Patent Number: 5,536,306
[45] Date of Patent: Jul. 16, 1996

[54] THERMAL INK-JET INKS HAVING REDUCED BLACK TO COLOR AND COLOR TO COLOR BLEED

[75] Inventors: Loren E. Johnson; Hiang P. Lauw; Norman E. Pawlowski, all of Corvallis; James P. Shields, Philomath; John M. Skene, Lake Oswego, all of Oreg.

[73] Assignee: Hewlett-Packard Company, Palo Alto, Calif.

[21] Appl. No.: 501,262

[22] Filed: Jul. 11, 1995

[51] Int. Cl.⁶ ................................. C09D 11/02
[52] U.S. Cl. ........................ 106/22 R; 106/22 H
[58] Field of Search ................... 106/22 R, 22 H

[56] References Cited

U.S. PATENT DOCUMENTS

| | | | |
|---|---|---|---|
| 4,685,968 | 8/1987 | Palmer | 106/22 R |
| 4,786,327 | 11/1988 | Wenzel et al. | 106/22 R |
| 4,963,189 | 10/1990 | Hindagolla | 106/22 K |
| 5,085,698 | 2/1992 | Ma et al. | 106/20 R |
| 5,143,547 | 9/1992 | Kappele | 106/22 R |
| 5,145,519 | 9/1992 | Kappele | 106/22 R |
| 5,185,034 | 2/1993 | Webb et al. | 106/22 R |
| 5,198,023 | 3/1993 | Stoffel | 106/22 R |
| 5,221,324 | 6/1993 | Ma et al. | 106/20 D |
| 5,302,197 | 8/1994 | Wickramanayke et al. | 106/22 H |
| 5,395,434 | 3/1995 | Tochihara et al. | 106/22 R |
| 5,476,541 | 12/1995 | Tochihara | 106/22 R |

*Primary Examiner*—Helene Klemanski

[57] ABSTRACT

A set of thermal ink-jet inks and method for formulating the same are provided in which the cyan, magenta, and yellow inks contain a combination of surfactants and inorganic salts designed to reduce both color to color bleed as well as black to color bleed. In general, the present cyan, magenta, and yellow inks each comprise about 0.1 to 4 wt. % of at least one dye; about 3 to 20 wt. % of at least one diol; 0 to about 5 wt. % of at least one glycol ether; about 3 to 9 wt. % of 2-pyrrolidone; up to about 4 wt. % of at least one component selected from the group consisting of biocides and buffers; and water. To achieve a reduction in color to color and black to color bleed, the cyan, magenta, and yellow inks are formulated to further comprise the following combination of surfactants and inorganic salts: (a) a surfactant component comprising about 1 to 4 wt. % of a first surfactant consisting essentially of at least one secondary alcohol ethoxylate surfactant predominantly having 4 to 8 ethoxylated units and an aliphatic chain having about 12 to 18 carbon atoms; and (b) about 3 to 6 wt. % of at least one inorganic salt component.

22 Claims, No Drawings

THERMAL INK-JET INKS HAVING REDUCED BLACK TO COLOR AND COLOR TO COLOR BLEED

CROSS-REFERENCE TO RELATED APPLICATION

The present application is related to application Serial No. 08/500,759, filed Jul. 11, 1995 [PD-1094540], which is directed to disclosing and claiming the use of the tetramethylammonium salt of Direct Blue 199 dye for reduced crusting in the ink set disclosed and claimed herein.

TECHNICAL FIELD

The present invention relates to ink compositions for thermal ink-jet printing, and, more particularly, to adding a combination of surfactants and multivalent ions, preferably calcium and magnesium, to thermal ink-jet ink compositions to reduce bleed between adjacently-printed colors.

BACKGROUND ART

In commercially-available thermal ink-jet color printers, such as the DeskJet® printer available from Hewlett-Packard Company, a color spectrum is achieved by combining cyan, magenta, and yellow inks in various proportions. The cyan, magenta, and yellow inks derive their hues from cyan, magenta, and yellow dyes, respectively. The particular set of dyes so employed constitutes a so-called "dye set". Color printers typically employ a four-pen set containing cyan, magenta, and yellow inks as well as a black ink.

Thermal ink-jet inks are commonly available as aqueous-based ink compositions that are formulated by dissolving dye in an ink vehicle. For example, a cyan ink would comprise a cyan dye dissolved in an ink vehicle. The dye molecules employed in ink-jet ink compositions are often in the form of dye salts made of a dye anion and a cation such as sodium. These dyes are designed to form solids in the target paper substrate by way of crystallization of the dye salt.

Controlling the behavior of printed ink compositions before crystallization of the dye salt is crucial in attaining good print quality. For example, many thermal inkjet inks, when printed in various colors on paper substrates, tend to bleed into one another. Bleed occurs as colors mix both on the surface of the paper substrate as well as within the substrate itself. It is desirable to have a border between colors that is clean and free from the invasion of one color into the other. One solution to the problem of color to color bleed involves increasing the penetration rate of the ink into the paper with the use of surfactants. However, increasing the penetration rate in this fashion may also reduce edge acuity. A solution to the specific problem of black to yellow color bleed is disclosed in U.S. Pat. No. 5,198,023, issued Mar. 30, 1993 and assigned to the same assignee as the present application, wherein multivalent cations such as calcium chloride and magnesium chloride are added at concentrations ranging from about 1 to 10 wt. % to yellow cationic inks to prevent bleed between yellow and black inks.

Reducing the bleed observed for a single ink is a somewhat piecemeal approach in that it fails to optimize print quality for a four-pen set. To achieve good overall print quality from a color printer such as the DeskJet® printer, a holistic approach is needed in which the cyan, magenta, and yellow inks are each specifically formulated to achieve reduced color to color and black to color bleed.

DISCLOSURE OF INVENTION

In accordance with the invention, a set of thermal ink-jet inks and method for formulating the same are provided in which each ink contains a combination of surfactants and inorganic salts designed to reduce both color to color bleed as well as black to color bleed. In the practice of the invention, the cyan, magenta, and yellow inks each comprise about 0.1 to 4 wt. % of at least one dye; about 3 to 20 wt. % of at least one diol; 0 to about 5 wt. % of at least one glycol ether; about 3 to 9 wt. % of 2-pyrrolidone; up to about 4 wt. % of at least one component selected from the group consisting of biocides and buffers; and water. The reduction in color to color and black to color bleed is achieved for the set of inks by formulating the cyan, magenta, and yellow inks to further comprise the following combination of surfactants and inorganic salts:

(a) a surfactant component comprising about 1 to 4 wt. % of a first surfactant consisting essentially of at least one secondary alcohol ethoxylate surfactant predominantly having 4 to 8 ethoxylated units and an aliphatic chain having about 12 to 18 carbon atoms; and (b) about 3 to 6 wt. % of at least one inorganic salt component.

The specific set of thermal ink-jet inks formulated in accordance with the invention exhibits reduced black to color bleed as well as reduced color to color bleed. Further, the present ink compositions offer good color saturation and light fade resistance.

BEST MODES FOR CARRYING OUT THE INVENTION

The invention described herein is directed to a set of color ink compositions for use with thermal ink-jet color printers, such as Hewlett-Packard's DeskJet® printer. A set of cyan, magenta, and yellow inks formulated in accordance with the invention will, when printed in various combinations, evidence reduced color to color and black to color bleed.

The present cyan, magenta, and yellow ink compositions each comprise in general about 0.1 to 4 wt. % of at least one dye and a vehicle comprising the following components (in wt. % of total ink composition): (a) about 3 to 20 wt. % of at least one diol; (b) 0 to about 5 wt. % of at least one glycol ether; (c) about 3 to 9 wt. % of 2-pyrrolidone; (d) up to about 4 wt. % of at least one component selected from the group consisting of biocides and buffers; and (e) water. In the practice of the invention, a reduction in color to color and black to color bleed is achieved by formulating the cyan, magenta, and yellow inks to further comprise the following combination of surfactants and inorganic salts:

(a) about 1 to 4 wt. % of a first surfactant consisting essentially of at least one secondary alcohol ethoxylate surfactant predominantly having 4 to 8 ethoxylated units and an aliphatic chain having about 12 to 18 carbon atoms; and (b) about 3 to 6 wt. % of at least one inorganic salt component.

The purity of all components is that employed in normal commercial practice for thermal ink-jet inks.

In the practice of the invention, the secondary alcohol ethoxylates serve to prevent color to color bleed by increasing the penetration of the inks into the print medium. Secondary alcohol ethoxylates are nonionic surfactants and are commercially-available, for example, from Union Carbide Co. (Houston, Tex.) as the Tergitol series, such as Tergitol 15-S-5 and Tergitol 15-S-7.

The secondary alcohol ethoxylates contain (a) an aliphatic chain having a prescribed number of carbon atoms in the chain and (b) a prescribed number of ethoxylated units. These ethoxylates are commercially available as mixtures of ethoxylates, and so are described in terms of the predominance of a given compound. Secondary alcohol ethoxylates suitably employed in the practice of the invention predominantly have about 12 to 18 carbon atoms in the aliphatic chain, while the number of ethoxylated units is predominantly in the range of 4 to 8 units, and preferably in the range of 5 to 7 units. Thus, "Tergitol 15-S-5" represents a secondary alcohol ethoxylate surfactant predominantly having 15 carbons in its aliphatic chain and 5 ethoxylated units. A mixture of secondary alcohol ethoxylates in which the predominant number of ethoxylated units is less than 4 is not very soluble in the ink, while if the predominant number of ethoxylated units is greater than 8, the surfactant loses effectiveness in preventing color bleed.

The amount of the secondary alcohol ethoxylate preferably employed in the practice of the invention is given by the sum of the two Tergitol components, 15-S-5 and 15-S-7, according to the formula $$[15\text{—}S\text{—}5]+[15\text{—}S\text{—}7]=\text{about 1 to 4 wt. \%},$$

where the square brackets denote the concentration in weight percent. Preferably, Tergitol 15-S-5 alone is present in the cyan and magenta inks in the range of about 1.5 to 3 wt. % and most preferably about 1.5 to 2.5 wt. %. In the yellow ink, a mixture of the two Tergitols is preferably employed, with 15-S-5 ranging from about 0.5 to 2 wt. % and 15-S-7 ranging from about 1 to 2 wt. %; in the most preferred case for the yellow ink, 15-S-5 ranges from about 0.8 to 1.2 wt. % and 15-S-7 ranges from about 1.3 to 1.7 wt. %.

Optionally, a second surfactant component may be employed in the practice of the invention, namely diphenyl sulfonate derivatives, which are anionic surfactants. Rather than address the problem of bleed, the presence of this second surfactant serves to correct a sporadic problem that results in mis-directed drops of ink due to puddling of ink on the nozzle plate as a consequence of different surface energies on the nozzle plate. The anionic surfactant apparently creates a substantially uniform surface energy and thus reduces the potential for mis-directed drops. An example of a suitably employed diphenyl sulfonate derivative is Dowfax 8390, available from Dow Chemical (Midland, Mich.). Dowfax 8390 is a sodium n-hexadecyl diphenyl oxide disulfonate. Other sources of such diphenyl sulfonate derivatives include Pilot Chemical (Calfax 16L35), Olin Chemical (Polytergent 4C3), and Sandoz Chemical (Sandoz Sulfonate 2A1 ). A diphenyl sulfonate derivative may comprise up to about 0.4 wt. % of the ink composition, and preferably comprises about 0.3 to 0.4 wt. %.

The inorganic salt component of the present ink vehicle serves to prevent bleed between black ink and the color inks, and comprises one or more inorganic salts. The salts must, of course, be soluble in the ink in the concentration employed. Suitably-employed cations for the inorganic salt include alkaline earth metals of group 2A of the periodic table (e.g.. magnesium and calcium); the transition metals of group 3B of the periodic table (e.g., lanthanum); cations from group 3A of the periodic table (e.g., aluminum); and lanthanides (e.g., neodymium). Preferably, calcium and magnesium are employed as cations in the practice of the invention. Suitably-employed anions associated with calcium include nitrate, chloride, acetate, benzoate, formate, and thiocyanate, while suitable anions associated with magnesium include nitrate, chloride, acetate, benzoate, bromide, citrate, formate, iodide, sulfate, fluoride, tartrate, and thiocyanate. Inorganic salts preferably employed in the practice of the invention are the nitrate, chloride, and acetate salts of calcium and magnesium. More specifically, the cyan and magenta inks of the present invention preferably employ magnesium nitrate while the yellow ink preferably employs calcium nitrate.

Diols suitably employed in the present thermal ink-jet ink compositions include any of, or a mixture of two or more of, such compounds as ethanediols (e.g., 1,2-ethanediol); propanediols (e.g., 1,2-propanediol, 1,3-propanediol, 2-ethyl-2-hydroxy-methyl-1,3 -propanediol, ethylhydroxy-propanediol (EHPD), etc.); butanediols (e.g., 1,3-butanediol, 1,4-butanediol, etc.); pentanediols (e.g., 1,5-pentanediol); and hexanediols (e.g., 1,6-hexanediol, 2,5-hexanediol, etc.). Preferably, 1,5-pentanediol and EHPD are employed in the practice of the invention.

The glycol ether component of the ink vehicle may comprise any of the glycol ethers and thioglycol ethers commonly employed in the inks used in ink-jet printing, or a mixture thereof. Examples of such compounds include polyalkylene glycols such as polyethylene glycols (e.g., diethylene glycol, triethylene glycol, tetraethylene glycol, etc.); polypropylene glycols (e.g., dipropylene glycol, tripropylene glycol, tetrapropylene glycol, etc.); polymeric glycols (e.g., PEG 200, PEG 300, PEG 400, PPG 400, etc.); and thiodiglycol. Preferably, diethylene glycol is employed in the practice of the invention.

The preferred concentration of pentanediol and glycol component in each ink is given by the formula $$2x[DEG]+[\text{pentanediol}]=\text{about 6 to 10 wt. \%},$$

where the square brackets denote the concentration in weight percent. For the more preferred cyan and magenta ink compositions, DEG is absent and 1,5-pentanediol is present in the range of about 7 to 9 wt. %, and most preferably about 7.5 to 8.5 wt. %. For the more preferred yellow ink composition, the amount of DEG ranges from about 3 to 5 wt. % and most preferably about 3.5 to 4.5 wt. %, and 1,5-pentanediol is absent.

EHPD is considered separately and is present in each ink in an amount in the range of about 6 to 9 wt. %. For the cyan and magenta inks, EHPD is preferably present within the range of about 7 to 8 wt. %, while for the yellow ink, EHPD is preferably present within the range of about 7.5 to 8.5 wt. %.

The other components of the present ink vehicle, namely buffers, biocides, and the like, are each commonly employed additives in thermal ink-jet ink compositions.

Buffers employed in the practice of the invention to modulate pH should be organic-based biological buffers, since inorganic buffers would likely precipitate in the presence of the relatively large amount of inorganic salts in the ink composition. Further, the buffer employed should provide a pH ranging from about 6 to 9 in the practice of the invention. Examples of preferably-employed buffers include Trizma Base, which is available from, for example, Aldrich Chemical (Milwaukee, Wis.), and 4-morpholine ethane sulfonic acid (MES).

Any of the biocides commonly employed in ink-jet inks may be employed in the practice of the invention, such as NUOSEPT 95, available from Hals America (Pis-cataway, N.J.); PROXEL GXL, available from ICI Americas (Wilmington, Del.); and glutaraldehyde, available from Union Carbide Company (Bound Brook, N.J.) under the trade designation UCARCIDE 250. PROXEL GXL is the preferred biocide.

Finally, another optional component that may be employed in the practice of the present invention is ammonium nitrate, which is used in conjunction with calcium-containing inorganic salts. Ammonium nitrate serves to prevent the precipitation of such calcium-containing inorganic salts in the ink upon exposure to the carbon dioxide in the air.

Anti-kogation of the inks is achieved by well-known substitution of cations on certain dyes with other cations. For example, sodium cations associated with Direct Blue 199 (used in the cyan ink) are substantially totally replaced with tetramethyl ammonium (TMA) cations, while sodium cations associated with Acid Red 52 (used in the magenta ink) are substantially totally replaced with lithium cations and sodium cations associated with Acid Yellow 23 (used in the yellow ink) are substantially totally replaced with TMA cations.

In the practice of the invention, cyan ink is formulated by combining purified Acid Blue 9 and Direct Blue 199 anionic dyes with the above-described ink vehicle, the latter dye being particularly known for providing high light fastness. Given the relatively high inorganic salt concentration in the cyan ink, Direct Blue 199 associated with sodium or ammonium would likely precipitate out of the vehicle. Thus, Direct Blue 199 is treated to substantially replace all or most of the as-supplied sodium or ammonium cation with TMA cation. The Acid Blue 9 anionic dye may remain associated with sodium in the practice of the invention. The substitution of TMA in Direct Blue 199 reduces crusting about the orifice attributable to cyan ink and enables the cyan ink to remain in solution in the presence of a relatively high concentration of organic salts. Since the Acid Blue 9 anionic dye may remain associated with sodium in the practice of the invention, the amount of Acid Blue 9 must be limited such that the presence of its associated sodium cation does not undo the benefits achieved by replacing the sodium or ammonium cation of Direct Blue 199 with TMA. Preferably, Direct Blue 199 and Acid Blue 9 are employed at concentrations ranging from about 2 to 3 wt. % and 1 to 2 wt. %, respectively. More preferably, the ratio of the concentration of Direct Blue 199 dye to the concentration of Acid Blue 9 dye in the present cyan ink is about 2:1 by weight.

A variety of methods may be used to replace the sodium or ammonium ion associated with Direct Blue 199 with TMA. Examples of such ion-exchange processes are disclosed in U.S. Pat. Nos. 4,685,968 and 4,786,327, both assigned to the same assignee as the present invention. The method of forming the TMA form of the DB 199 dye forms no part of this invention.

Preferably, the cyan ink is prepared according to the following formulation and buffered to a pH of about 8:

(a) about 0.1 to 4 wt. % of a mixture of Direct Blue 199-TMA and Acid Blue 9-Na, with Direct Blue 199-TMA more preferably present at about 2 to 3 wt. % and Acid Blue 9-Na more preferably present at about 1 to 2 wt. %, most preferably with the ratio by weight of Direct Blue 199 to Acid Blue 9 being about 2:1;

(b) a mixture of DEG and 1,5-pentanediol given by the formula $$2x[DEG]+[\text{pentanediol}]=\text{about 6 to 10 wt. \%}$$

and about 6 to 9 wt. % ethylhydroxypropanediol (EHPD), with 1,5-pentanediol being more preferably present at about 7 to 9 wt. % (and DEG absent) and most preferably about 7.5 to 8.5 wt. %, and with EHPD being preferably present at about 7 to 8 wt. % of the ink composition;

(c) about 3 to 9 wt. % of 2-pyrrolidone, with about 6 to 9 wt. % being more preferable and about 7 to 8 wt. % being most preferable;

(d) about 3 to 6 wt. % of a mixture of magnesium nitrate and/or calcium nitrate, with 4 to 5 wt. % magnesium nitrate alone being more preferable;

(e) about 1 to 4 wt. % of a mixture of Tergitol 15-S-5 and/or Tergitol 15-S-7, with Tergitol 15-S-5 being more preferably employed alone ranging from about 1.5 to 3 wt. % or, most preferably, 1.5 to 2.5 wt. %;

(f) up to about 0.4 wt. % of Dowfax 8390 surfactant, with about 0.3 to 0.4 wt. % being more preferable;

(g) about 0.1 to 1 wt. % of a buffer, preferably Trizma Base or MES;

(h) up to about 1 wt. % of a biocide, preferably PROXEL GXL; and (i) the balance water.

The magenta ink employed in the practice of the invention is formulated by combining purified Reactive Red 180 in its hydrolized form and purified Acid Red 52 anionic dye with an ink vehicle comprised of the above-described components and concentration ranges. The Acid Red 52 anionic dye is preferably treated to replace the as-supplied sodium cation with lithium. Preferably, the ratio of the concentration of Reactive Red 180 to the concentration of Acid Red 52 in the present magenta ink is about 1:1 by weight. Any of a variety of methods may be used to replace the sodium ion associated with Acid Red 52 with lithium, such as an ion-exchange process. The method of forming the lithium form of the dye forms no pan of this invention.

Preferably, the magenta ink is prepared according to the following formulation and is buffered to a pH of about 7:

(a) about 0.1 to 4 wt. % of a mixture of Reactive Red 180 and Acid Red 52-Li, with the ratio by weight of Reactive Red 180 to Acid Red 52 being more preferably about 1:1;

(b) a mixture of DEG and 1,5-pentanediol given by the formula $$2x[DEG]+[\text{pentanediol}]=\text{about 6 to 10 wt. \%}$$

and about 6 to 9 wt. % ethylhydroxypropanediol (EHPD), with 1,5-pentanediol being more preferably present at about 7 to 9 wt. % (and DEG absent) and most preferably about 7.5 to 8.5 wt. %, and with EHPD being preferably present at about 7 to 8 wt. % of the ink composition;

(c) about 3 to 9 wt. % of 2-pyrrolidone, with about 6 to 9 wt. % being more preferable and about 7 to 8 wt. % being most preferable;

(d) about 3 to 6 wt. % of a mixture of magnesium nitrate and/or calcium nitrate, with 4 to 5 wt. % magnesium nitrate alone being more preferable;

(e) about 1 to 4 wt. % of a mixture of Tergitol 15-S-5 and/or Tergitol 15-S-7, with Tergitol 15-S-5 being more preferably employed alone ranging from about 1.5 to 3 wt. % or, most preferably, 1.5 to 2.5 wt. %;

(f) up to about 0.4 wt. % of Dowfax 8390 surfactant, with about 0.3 to 0.4 wt. % being more preferable;

(g) about 0.1 to 1 wt. % of a buffer, preferably Trizma base or MES;

(h) up to about 1 wt. % of a biocide, preferably PROXEL GXL; and (i) the balance water.

The yellow ink employed in the practice of the invention is formulated by combining purified Acid Yellow 23 anionic dye with an ink vehicle comprising the above-described components and concentration ranges. The Acid Yellow 23 anionic dye is preferably treated to replace the as-supplied sodium cation with tetramethylammonium, which may be accomplished by a process such as ion-exchange. The method of forming the TMA form of the dye forms no part of this invention.

Preferably, the yellow ink is prepared according to the following formulation and buffered to a pH of about 6.5:

(a) about 0.1 to 4 wt. % of Acid Yellow 23-TMA;

(b) a mixture of DEG and 1,5-pentanediol given by the formula $$2x[DEG]+[pentanediol]=\text{about 6 to 10 wt. \%}$$

and about 6 to 9 wt. % ethylhydroxypropanediol, with the DEG being more preferably present in the mixture at about 3 to 5 wt. % (and 1,5 pentanediol absent) and most preferably about 3.5 to 4.5 wt. %, and the ethylhydroxypropanediol being more preferably present at about 7.5 to 8.5 wt. %;

(c) about 3 to 9 wt. % of 2-pyrrolidone, with about 3 to 5 wt. % being more preferable and about 3.5 to 4.5 wt. % being most preferable;

(d) about 3 to 6 wt. % of a mixture of magnesium nitrate and/or calcium nitrate, with 4 to 5 wt. % calcium nitrate alone being more preferable;

(e) about 1 to 4 wt. % of a mixture of Tergitol 15-S-5 and/or Tergitol 15-S-7, with a mixture of about 0.5 to 2 wt. % Tergitol 15-S-5 and about 1 to 2 wt. % Tergitol 15-S-7 being more preferable or, most preferably, a mixture of about 0.8 to 1.2 wt. % Tergitol 15-S-5 and about 1.3 to 1.7 wt. % Tergitol 15-S-7;

(f) up to about 0.4 wt. % of Dowfax 8390 surfactant, with about 0.3 to 0.4 wt. % being more preferable;

(g) about 0.1 to 1 wt. % of a buffer, preferably Trizma base or MES;

(h) up to about 1 wt. % of a biocide, preferably PROXEL GXL; and (i) the balance water.

Finally, the black ink employed in the present ink set may be any dye-based or a pigment-based ink that is suitably employed in thermal ink-jet printing. Suitable black dye-based inks are disclosed and claimed, for example, in U.S. Pat. No. 4,963,189, entitled "Waterfast Ink Formulations with a Novel Series of Anionic Dyes Containing Two or More Carboxyl Groups" and assigned to the present assignee. Suitable black pigment-based inks are disclosed and claimed, for example, in U.S. Pat. No. 5,085,698, entitled "Aqueous Pigmented Inks for Ink Jet Printers", in U.S. Pat. No. 5,221,334, entitled "Aqueous Pigmented Inks for Ink Jet Printers", and in U.S. Pat. No. 5,302,197, entitled "Ink Jet Inks", all assigned to E.I. Du Pont de Nemours and Company.

EXAMPLES

Inks were prepared having the formulations listed in Table I.

TABLE I

Formulation of an Ink Set of the Invention.

| | CYAN | MAGENTA | YELLOW |
|---|---|---|---|
| 1,5-pentanediol | 8 wt % | 8 wt % | — |
| Diethylene glycol | — | — | 4 wt % |
| EHPD | 7.5 wt % | 7.5 wt % | 8 wt % |
| 2-pyrrolidone | 7.5 wt % | 7.5 wt % | 4 wt % |
| Tergitol 15-S-5 | 2.0 wt % | 2.0 wt % | 1 wt % |
| Tergitol 15-S-7 | — | — | 1.5 wt % |
| Calfax 16L-35 | 0.37 wt % | 0.37 wt % | 0.37 wt % |
| Calcium nitrate tetrahydrate | — | — | 7 wt % |
| Magnesium nitrate hexahydrate | 6.0 wt % | 6.0 wt % | — |
| PROXEL GXL | 0.2 wt % | 0.2 wt % | 0.2 wt % |
| MES | — | 0.2 wt % | 0.2 wt % |
| Trizma base | 0.2 wt % | — | — |
| CYAN | | | |
| Na Acid Blue 9 (Abs at 1:10,000 dilution) | 0.158 | — | — |
| TMA-Direct Blue 199 (Abs at 1:10,000 dilution) | 0.090 | — | — |
| MAGENTA | | | |
| Reactive Red 180 (Abs at 1:10,000 dilution) | — | 0.090 | — |
| Li-Acid Red 52 (Abs at 1:10,000 dilution) | — | 0.135 | — |
| YELLOW | | | |
| TMA-Acid Yellow 23 (Abs at 1:10,000 dilution) | — | — | 0.128 |
| pH | 8.0 | 7.0 | 6.5 |

For comparison, three additional series of inks were prepared, with each series having a yellow, magenta, cyan and black ink. One series comprised a set of inks employed in Hewlett-Packard's DeskJet® 550C printer; another series of inks comprised a set of inks employed in Hewlett-Packard's DeskJet® 1200C printer; and a third series of inks comprised a set of inks employed in Hewlett-Packard's PaintJet® XL300 printer.

Four different qualities of the formulated inks were measured in an effort to assess the benefits attained in the practice of the invention, namely, color gamut volume, light fade resistance, color to color bleed, and black to color bleed. Each of the tests is discussed in turn below.

A color gamut volume measurement was made for each series of inks and is reported in Table II. Color gamut volume was measured using the formula L×a×b (color space coordinates), which is a well-known technique in the art. As is known, it is desirable that the color gamut volume be maximized in an ink composition. A comparison of the color gamut volumes measured for the four series of inks shows that the inks made in accordance with the present invention (the first series of inks) exhibit color gamut volumes within the range of those observed for the other series of inks. Thus, inks formulated in accordance with the invention do not sacrifice color gamut volume to achieve bleed resistance.

Light fade was measured for each of the twelve inks and is reported in Table II. Light fade was measured by printing two sheets with each ink, one of which was placed in the dark and the other of which was placed in an Atlas Fadeometer and exposed to the equivalent of one year of office light. A measurement of light fade was then obtained by comparing the ink on the two sheets. It is desirable that the light fade value be minimized. As evidenced by the values in Table II, each of the inks formulated in accordance with the present invention have significantly lower light fade values compared to like-colored inks of the remaining three series.

Black to color bleed was assessed for the first and second series of inks. A solid line of the yellow ink of each series was printed adjacent to a solid line of the black ink, with the color line just touching the black line. The amount of bleed was measured from invasion of black ink into the adjacent color ink and is reported in Table II as a bleed index. It is, of course, desirable to minimize the bleed index. As evidenced by the bleed index figures, the ink prepared in accordance with the present invention exhibited a significantly lower bleed index than the DeskJet® 550C ink.

Color to color bleed was also assessed for the first and second series of inks. A solid area fill box of the magenta ink of a given series was first printed, followed by a line of cyan ink of that series through the rectangle. The amount of color to color bleed was measured from invasion of the cyan ink into the magenta ink and is reported in Table II as a bleed index. Again, a lower bleed index is desirable. As evidenced by the bleed index figures, the color to color bleed is seen to be minimal.

TABLE II

Comparison of Prepared Inks By Color Gamut Volume, Light Fade, and Black to Black and Black to Color Bleed.

| Ink Series | Color Gamut Volume | Light Fade Resistance | | | Bleed Index | |
|---|---|---|---|---|---|---|
| | | Yellow | Magenta | Cyan | Color to Color | Black to Color |
| 1 | 282 | 15.7 | 36.2 | 15.4 | −1 | 0.5 |
| 2 | 281 | 18.8 | 78 | 42.5 | −1 | 5.0 |
| 3 | 292 | 28 | 47 | 50.8 | — | — |
| 4 | 286 | 39.8 | 62.6 | 49.3 | — | — | where:

Ink Series 1 represents inks prepared in accordance with the invention;

Ink Series 2 represents inks commercially available for Hewlett-Packard's DeskJet® 550C printer;

Ink Series 3 represents inks commercially available for Hewlett-Packard's DeskJet® 1200C printer; and Ink Series 4 represents inks commercially available for Hewlett-Packard's Paint-Jet® XL300 printer.

Thus, it has been demonstrated that a four-pen set containing cyan, magenta, and yellow inks formulated in accordance with the present invention to contain the prescribed combination of surfactants and inorganic salts exhibits increased light fastness and reduced bleed without sacrificing color gamut volume.

INDUSTRIAL APPLICABILITY

The specific ink set disclosed herein is expected to find commercial use in thermal ink-jet color printers.

Thus, there has been disclosed a specific ink set for use in thermal ink-jet color printing. It will be readily apparent to those skilled in the art that various changes and modifications of an obvious nature may be made without departing from the spirit of the invention, and all such changes and modifications are considered to fall within the scope of the invention as defined by the appended claims.

What is claimed is:

1. A set of thermal ink-jet inks for thermal ink-jet printing comprising a cyan ink, a magenta ink, a yellow ink, and a black ink, said cyan, magenta, and yellow inks comprising about 0.1 to 4 wt. % of at least one dye, about 3 to 20 wt. % of at least one diol, 0 to about 5 wt. % of at least one glycol ether, about 3 to 9 wt. % of 2-pyrrolidone, up to about 4 wt. % of at least one component selected from the group consisting of biocides and buffers, and water, said cyan, magenta, and yellow inks exhibiting a reduction in color to color and black to color bleed between said cyan, magenta, yellow, and black inks once printed by further comprising:

(a) a surfactant component comprising about 1 to 4 wt. % of a first surfactant consisting essentially of at least one secondary alcohol ethoxylate surfactant predominantly having 4 to 8 ethoxylated units and an aliphatic chain having about 12 to 18 carbon atoms; and (b) about 3 to 6 wt. % of at least one inorganic salt component.

2. The set of thermal ink-jet inks of claim 1 wherein said first surfactant is selected from the group consisting of a secondary alcohol ethoxylate surfactant predominantly having 5 ethoxylated units and an aliphatic chain of about 15 carbon atoms, a secondary alcohol ethoxylate surfactant predominantly having 7 ethoxylated units and an aliphatic chain of about 15 carbon atoms, and mixtures thereof.

3. The set of thermal ink-jet inks of claim 1 wherein said at least one inorganic salt component has a cation selected from the group consisting of an alkaline earth metal of group 2A of the periodic table, a transition metal of group 3B of the periodic table, an element of group 3A of the periodic table, and a lanthanide.

4. The set of thermal ink-jet inks of claim 3 wherein said cation is selected from the group consisting of calcium and magnesium.

5. The set of thermal ink-jet inks of claim 4 wherein said calcium forms said at least one inorganic salt by associating with an anion selected from the group consisting of nitrate, chloride, acetate, benzoate, formate, and thiocyanate and said magnesium forms said at least one inorganic salt by associating with an anion selected from the group consisting of nitrate, chloride, acetate, benzoate, bromide, citrate, formate, iodide, sulfate, fluoride, tartrate, and thiocyanate.

6. The set of thermal ink-jet inks of claim 5 wherein said calcium and magnesium cation are associated with an anion selected from the group consisting of nitrate, chloride, and acetate.

7. The set of thermal ink-jet inks of claim 1 wherein said cyan, magenta, and yellow inks further comprise up to about 0.4 wt. % of a second surfactant consisting essentially of at least one diphenyl sulfonate derivative surfactant.

8. The set of thermal ink-jet inks of claim 7 wherein said second surfactant ranges from about 0.3 to 0.4 wt. % of each of said cyan, magenta, and yellow inks.

9. The set of thermal ink-jet inks of claim 1 wherein said cyan, magenta, and yellow inks comprise about 0.1 to 4 wt. % of at least one dye, about 6 to 10 wt. % of a solvent selected from the group consisting of 1,5-pentanediol, diethylene glycol, and mixtures thereof having the formula 2x(wt. % diethylene glycol)+(wt. % 1,5-pentanediol)= (wt. % solvent), about 6 to 9 wt. % ethylhydroxypropanediol, about 3 to 9 wt. % of 2-pyrrolidone, about 0.1 to 1 wt. % of a buffer, up to about 1 wt. % of a biocide, up to about 0.4 wt. % of at least one diphenyl sulfonate derivative, and water, said cyan, magenta, and yellow inks exhibiting a reduction in color to color and black to color bleed between said cyan, magenta, yellow, and black inks once printed by further comprising:

(a) a surfactant component comprising about 1 to 4 wt. % of a first surfactant selected from the group consisting of a secondary alcohol ethoxylate surfactant predominantly having 5 ethoxylated units and an aliphatic chain of about 15 carbon atoms, a secondary alcohol ethoxylate surfactant predominantly having 7 ethoxylated units and an aliphatic chain of about 15 carbon atoms, and mixtures thereof; and (b) about 3 to 6 wt. % of at least one inorganic salt component, selected from the group consisting of calcium nitrate and magnesium nitrate.

10. The set of thermal ink-jet inks of claim 9 wherein (a) said at least one dye of said cyan ink comprises Direct Blue 199 anionic dye and Acid Blue 9 anionic dye;

(b) said at least one dye of said yellow ink comprises Acid Yellow 23 anionic dye; and (c) said at least one dye of said magenta ink comprises Reactive Red 180 dye and Acid Red 52 anionic dye.

11. The set of thermal ink-jet inks of claim 9 wherein: said cyan ink has the formula (a) about 0.1 to 4 wt. % of cyan dye comprising Direct Blue 199 anionic dye and Acid Blue 9, (b) about 7 to 9 wt. % 1,5-pentanediol, (c) about 7 to 8 wt. % ethylhydroxypropanediol, (d) about 6 to 9 wt. % 2-pyrrolidone, (e) about 4 to 5 wt. % magnesium nitrate, (f) about 1.5 to 3 wt. % of a secondary alcohol ethoxylate surfactant predominantly having about 5 ethoxylated units and an aliphatic chain of about 15 carbon atoms, (g) about 0.3 to 0.4 wt. % of at least one diphenyl sulfonate derivative surfactant, (h) about 0.1 to 1 wt. % of a buffer, (i) up to about 1 wt. % of a biocide, and (j) the balance water; said magenta ink has the formula (a) about 0.1 to 4 wt. % of magenta dye comprising Reactive Red 180 and Acid Red 52 anionic dye, (b) about 7 to 9 wt. % 1,5-pentanediol, (c) about 7 to 8 wt. % ethylhydroxypropanediol, (d) about 6 to 9 wt. % of 2-pyrrolidone, (e) about 4 to 5 wt. % magnesium nitrate, (f) about 1.5 to 3 wt. % of a secondary alcohol ethoxylate surfactant predominantly having about 5 ethoxylated units and an aliphatic chain of about 15 carbon atoms, (g) about 0.3 to 0.4 wt. % of at least one diphenyl sulfonate derivative surfactant, (h) about 0.1 to 1 wt. % of a buffer, (i) up to about 1 wt. % of a biocide, and (j) the balance water; and said yellow ink has the formula (a) about 0.1 to 4 wt. % of Acid Yellow 23, (b) about 3 to 5 wt. % diethylene glycol, (c) about 7.5 to 8.5 wt. % ethylhydroxypropanediol, (d) about 3 to 5 wt. % of 2-pyrrolidone, (e) about 4 to 5 wt. % calcium nitrate, (f) about 0.5 to 2 wt. % of a secondary alcohol ethoxylate surfactant predominantly having about 5 ethoxylated units and an aliphatic chain of about 15 carbon atoms and about 1 to 2 wt. % of a secondary alcohol ethoxylate surfactant predominantly having about 7 ethoxylated units and an aliphatic chain of about 15 carbon atoms, (g) about 0.3 to 0.4 wt. % of at least one diphenyl sulfonate derivative surfactant, (h) about 0.1 to 1 wt. % of a buffer, (i) up to about 1 wt. % of a biocide, and (j) the balance water.

12. A method for reducing color to color and black to color bleed in a set of thermal ink-jet inks for thermal-ink-jet printing, said set of thermal ink-jet inks comprising a cyan ink, a magenta ink, a yellow ink, and a black ink, said cyan, magenta, and yellow inks each comprising about 0.1 to 4 wt. % of at least one dye, about 3 to 20 wt. % of at least one diol, 0 to about 5 wt. % of at least one glycol ether, about 3 to 9 wt. % of 2-pyrrolidone, up to about 4 wt. % biocides and buffers, and water, wherein the reduction in bleed in said inks is achieved by formulating said cyan, magenta, and yellow inks to further comprise:

(a) a surfactant component comprising about 1 to 4 wt. % of a first surfactant consisting essentially of at least one secondary alcohol ethoxylate surfactant predominantly having 4 to 8 ethoxylated units and an aliphatic chain having about 12 to 18 carbon atoms; and (b) about 3 to 6 wt. % of at least one inorganic salt component.

13. The method of claim 12 wherein said first surfactant is selected from the group consisting of a secondary alcohol ethoxylate surfactant predominantly having 5 ethoxylated units and an aliphatic chain of about 15 carbon atoms, a secondary alcohol ethoxylate surfactant predominantly having 7 ethoxylated units and an aliphatic chain of about 15 carbon atoms, and mixtures thereof.

14. The method of claim 12 wherein said at least one inorganic salt component has a cation selected from the group consisting of an alkaline earth metal of group 2A of the periodic table, a transition metal of group 3B of the periodic table, an element of group 3A of the periodic table, and a lanthanide.

15. The method of claim 14 wherein said cation is selected from the group consisting of calcium and magnesium.

16. The method of claim 15 wherein said calcium forms said at least one inorganic salt by associating with an anion selected from the group consisting of nitrate, chloride, acetate, benzoate, formate, and thiocyanate and said magnesium forms said at least one inorganic salt by associating with an anion selected from the group consisting of nitrate, chloride, acetate, benzoate, bromide, citrate, formate, iodide, sulfate, fluoride, tartrate, and thiocyanate.

17. The method of claim 16 wherein said calcium and magnesium cation are associated with an anion selected from the group consisting of nitrate, chloride, and acetate.

18. The method of claim 12 wherein said cyan, magenta, and yellow inks further comprise up to about 0.4 wt. % of a second surfactant consisting essentially of at least one diphenyl sulfonate derivative surfactant.

19. The method of claim 18 wherein said second surfactant ranges from about 0.3 to 0.4 wt. % of each of said cyan, magenta, and yellow inks.

20. The method of claim 12 wherein said cyan, magenta, and yellow inks comprise about 0.1 to 4 wt. % of at least one dye, about 6 to 10 wt. % of a solvent selected from the group consisting of 1,5-pentanediol, diethylene glycol, and mixtures thereof having the formula 2x (wt. % diethylene glycol)+(wt. % 1,5-pentanediol)= (wt. % solvent), about 6 to 9 wt. % ethylhydroxypropanediol, about 3 to 9 wt. % of 2-pyrrolidone, about 0.

1 to 1 wt. % of a buffer, up to about 1 wt. % of a biocide, up to about 0.4 wt. % of at least one diphenyl sulfonate derivative, and water, wherein the reduction in bleed in said inks is achieved by formulating said cyan, magenta, and yellow inks to further comprise:

(a) a surfactant component comprising about 1 to 4 wt. % of a first surfactant selected from the group consisting of a secondary alcohol ethoxylate surfactant predominantly having 5 ethoxylated units and an aliphatic chain of about 15 carbon atoms, a secondary alcohol ethoxylate surfactant predominantly having 7 ethoxylated units and an aliphatic chain of about 15 carbon atoms, and mixtures thereof; and (b) about 3 to 6 wt. % of at least one inorganic salt component selected from the group consisting of calcium nitrate and magnesium nitrate.

21. The method of claim 20 wherein (a) said at least one dye of said cyan ink comprises Direct Blue 199 anionic dye and Acid Blue 9 anionic dye;

(b) said at least one dye of said yellow ink comprises Acid Yellow 23 anionic dye; and (c) said at least one dye of said magenta ink comprises Reactive Red 180 dye and Acid Red 52 anionic dye.

22. The method of claim 20 wherein: said cyan ink has the formula (a) about 0.1 to 4 wt. % of cyan dye comprising Direct Blue 199 anionic dye and Acid Blue 9, (b) about 7 to 9 wt. % 1,5-pentanediol, (c) about 7 to 8 wt. % ethylhydroxypropanediol, (d) about 6 to 9 wt. % 2-pyrrolidone, (e) about 4 to 5 wt. % magnesium nitrate, (f) about 1.5 to 3 wt. % of a secondary alcohol ethoxylate surfactant predominantly having about 5 ethoxylated units and an aliphatic chain of about 15 carbon atoms, (g) about 0.3 to 0.4 wt. % of at least one diphenyl sulfonate derivative surfactant, (h) about 0.1 to 1 wt. % of a buffer, (i) up to about 1 wt. % of a biocide, and (j) the balance water; said magenta ink has the formula (a) about 0.1 to 4 wt. % of magenta dye comprising Reactive Red 180 and Acid Red 52 anionic dye, (b) about 7 to 9 wt. % 1,5-pentanediol, (c) about 7 to 8 wt. % ethylhydroxypropanediol, (d) about 6 to 9 wt. % of 2-pyrrolidone, (e) about 4 to 5 wt. % magnesium nitrate, (f) about 1.5 to 3 wt. % of a secondary alcohol ethoxylate surfactant predominantly having about 5 ethoxylated units and an aliphatic chain of about 15 carbon atoms, (g) about 0.3 to 0.4 wt. % of at least one diphenyl sulfonate derivative surfactant, (h) about 0.1 to 1 wt. % of a buffer, (i) up to about 1 wt. % of a biocide, and (j) the balance water; and said yellow ink has the formula (a) about 0.1 to 4 wt. % of Acid Yellow 23, (b) about 3 to 5 wt. % diethylene glycol, (c) about 7.5 to 8.5 wt. % ethylhydroxypropanediol, (d) about 3 to 5 wt. % of 2-pyrrolidone, (e) about 4 to 5 wt. % calcium nitrate, (f) about 0.5 to 2 wt. % of a secondary alcohol ethoxylate surfactant predominantly having about 5 ethoxylated units and an aliphatic chain of about 15 carbon atoms and about 1 to 2 wt. % of a secondary alcohol ethoxylate surfactant predominantly having about 7 ethoxylated units and an aliphatic chain of about 15 carbon atoms, (g) about 0.3 to 0.4 wt. % of at least one diphenyl sulfonate derivative surfactant, (h) about 0.1 to 1 wt. % of a buffer, (i) up to about 1 wt. % of a biocide, and (j) the balance water.

* * * * *